(12) United States Patent
Czainski (10) Patent No.: US 9,895,989 B2
(45) Date of Patent: Feb. 20, 2018

(54) SAFETY SYSTEM, A METHOD OF OPERATING A SAFETY SYSTEM AND A METHOD OF BUILDING A SAFETY SYSTEM

(71) Applicant: Bombardier Transportation GmbH, Berlin (DE)

(72) Inventor: Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 218 days.

(21) Appl. No.: 14/652,469

(22) PCT Filed: Dec. 16, 2013

(86) PCT No.: PCT/EP2013/076694
§ 371 (c)(1),
(2) Date: Jun. 16, 2015

(87) PCT Pub. No.: WO2014/095714
PCT Pub. Date: Jun. 26, 2014

(65) Prior Publication Data
US 2015/0328996 A1 Nov. 19, 2015

(30) Foreign Application Priority Data
Dec. 17, 2012 (GB) .................................. 1222713.8

(51) Int. Cl.
*B60L 11/18* (2006.01)
*G01D 5/24* (2006.01)
(Continued)

(52) U.S. Cl.
CPC ............ *B60L 11/182* (2013.01); *B60L 5/005* (2013.01); *B60M 1/04* (2013.01); *B60M 7/003* (2013.01);
(Continued)

(58) Field of Classification Search
CPC .................................................... B60L 11/182
(Continued)

(56) References Cited

U.S. PATENT DOCUMENTS 5,821,728 A * 10/1998 Schwind ............... B60L 11/182
320/108
7,451,839 B2 * 11/2008 Perlman ................ B60L 11/123
180/167

(Continued)

FOREIGN PATENT DOCUMENTS

DE 202009009693 U1 12/2010
DE 102011015980 A1 10/2012
(Continued)

*Primary Examiner* — Drew A Dunn
*Assistant Examiner* — Jerry D Robbins
(74) *Attorney, Agent, or Firm* — The Webb Law Firm (57) ABSTRACT

The invention relates to a safety system for an inductive power transfer system for transferring power to a vehicle on a surface of a route, wherein the primary unit comprises at least one primary winding for generating an electromagnetic primary field for the inductive power transfer, wherein a charging surface of the route is assigned to the primary winding. The safety system comprises at least one capacitive sensing system, wherein the capacitive sensing system comprises multiple detection capacitors, wherein the multiple detection capacitors are arranged in an array structure, and wherein the array structure covers the charging surface at least partially. A method of operating the safety system and a method of building the safety system is proposed.

13 Claims, 5 Drawing Sheets

(51) Int. Cl.
 *H02J 50/10* (2016.01)
 *H02J 50/60* (2016.01)
 *B60L 5/00* (2006.01)
 *B60M 1/04* (2006.01)
 *B60M 7/00* (2006.01)
 *H02J 5/00* (2016.01)

(52) U.S. Cl.
 CPC ............ *G01D 5/2405* (2013.01); *H02J 5/005* (2013.01); *H02J 50/10* (2016.02); *H02J 50/60* (2016.02); *B60L 2200/26* (2013.01); *Y02T 10/7005* (2013.01); *Y02T 10/7072* (2013.01); *Y02T 90/122* (2013.01); *Y02T 90/14* (2013.01); *Y10T 29/49004* (2015.01)

(58) Field of Classification Search
 USPC ........................................................ 320/108
 See application file for complete search history.

(56) References Cited

U.S. PATENT DOCUMENTS

| | | | |
|---|---|---|---|
| 8,024,084 B2 * | 9/2011 | Breed | B60C 23/0493 340/438 |
| 8,469,122 B2 * | 6/2013 | Perlman | B60L 11/1816 180/168 |
| 9,008,854 B2 * | 4/2015 | Breed | G01C 21/26 701/1 |
| 9,306,318 B2 * | 4/2016 | Reisinger | A61N 1/3754 |
| 2009/0038902 A1 * | 2/2009 | Yechuri | B60L 5/005 191/48 |
| 2009/0045773 A1 * | 2/2009 | Pandya | B60L 5/005 320/108 |
| 2011/0074346 A1 | 3/2011 | Hall et al. | |
| 2012/0049850 A1 | 3/2012 | Reime | |
| 2013/0307532 A1 | 11/2013 | Reime | |

FOREIGN PATENT DOCUMENTS

| | | |
|---|---|---|
| EP | 2317625 A2 | 5/2011 |
| WO | 2009081115 A1 | 7/2009 |
| WO | 2010133328 A1 | 11/2010 |
| WO | 2012047779 A1 | 4/2012 |
| WO | 2012104086 A2 | 8/2012 |
| WO | 2012164973 A1 | 12/2012 |
| WO | 2013001811 A1 | 1/2013 |

\* cited by examiner

SAFETY SYSTEM, A METHOD OF OPERATING A SAFETY SYSTEM AND A METHOD OF BUILDING A SAFETY SYSTEM

CROSS-REFERENCE TO RELATED APPLICATIONS

This application is the United States national phase of International Application No. PCT/EP2013/076694 filed Dec. 16, 2013, and claims priority to United Kingdom Patent Application No. 1222713.8 filed Dec. 17, 2012, the disclosures of which are hereby incorporated in their entirety by reference.

BACKGROUND OF THE INVENTION

Field of the Invention

The invention relates to a safety system for an inductive power transfer system, in particular for a primary unit of such a transfer system, for transferring electric energy to a vehicle which is standing or travelling on a surface of a route. Furthermore, the invention relates to a method of operating such a safety system and a method of building such a safety system.

Description of Related Art

WO 2012/047779 A1 discloses a safety system for a charger to provide protection with respect to an object that may become hot during operation of the charger, wherein the safety system comprises a detection subsystem configured to detect presence of the object and substantial proximity to the charger and a notification subsystem operatively coupled to the detection subsystem and configured to provide an indication of the object. The publication discloses that one or more inductive sensors can be integrated into a source device, source housing, vehicle, or surrounding area to detect obstructions and foreign objects and/or materials between the source and device resonators.

WO 2009/081115 A1 discloses a primary unit for use in an inductive power transfer system, the primary unit being operable to transmit power wirelessly by electromagnetic induction to at least one secondary unit of the system located in proximity to the primary unit and/or to a foreign object located in set proximity, wherein the primary unit comprises driving means operable to drive the primary unit so that in a driven state the magnitude of an electrical drive signal supplied to one or more primary coils of the primary unit changes from a first value to a second value. Furthermore, the primary unit comprises means for assessing the effect of such driving on an electrical characteristic of the primary unit and means for detecting in dependence upon the assessed effect the presence of said secondary unit and/or foreign object located in proximity to said primary unit.

EP 2317625 A2 discloses a primary device for inductive power transfer to a secondary device, wherein the primary device comprises a primary coil, wherein the primary device is being configured to (i) operate in a first mode during which the primary coil transfers power to inductive coupling to the secondary device and (ii) operate in a second mode during which a foreign object is detected. Furthermore, a primary control is configured to operate the primary coil (i) using a first frequency during the first mode and (ii) using a second frequency during the second mode.

It is an object of the present invention to provide the safety system for an inductive power transfer system, a method of operating such a safety system and a method of building a safety system which provides reliable and fast detection of a foreign object, in particular a metal object, located in proximity of a primary winding structure of the primary winding.

It is a basic idea of the present invention that a foreign object located in the proximity of a primary winding structure of the primary unit will cause a change in electrical characteristics of a detection structure, in particular a change of a capacitance.

The present invention can be applied to the field of energy transfer to any land vehicle, including track bound vehicles, such as rail vehicles (e.g. trams), and also to road automobiles, such as individual (private) passenger cars or public transport vehicles (e.g. busses).

A problem in such devices is that it is generally not possible to mechanically prevent foreign objects, in particular objects made of metal, from being placed into proximity with the primary unit of an inductive power transfer system. Such foreign objects may e.g. comprise a coin, a can, a key, a tool and other objects. The varying magnetic field generated by the primary winding structure or coil system may induce current in the foreign objects made of metal. Such currents may cause power losses and heating of the object. Heating of the foreign objects may be dangerous for example to persons trying to touch and remove the foreign object and/or may damage the surface the foreign object is placed on or parts of the primary unit.

SUMMARY OF THE INVENTION

A safety system for an inductive power transfer system for transferring power to a vehicle, which is standing or travelling on a surface of a route, in particular for a primary unit of such a transfer system, is proposed. In general, the safety system can be part of the primary unit.

The inductive power transfer system comprises a route-sided primary unit with a primary winding structure. The primary winding structure generates a primary electromagnetic field which is received by a vehicle-sided secondary unit, which is also known as receiver or pick-up. In between the primary winding structure and a secondary winding structure of the secondary unit, there is an air gap through which the primary field or total field extends. The secondary winding structure can generate a secondary field, e.g. if a current flows in the secondary winding structure. The current can e.g. be generated at least partially by the mutual induction between the primary winding structure and the secondary winding structure.

The inductive power transfer system can be a transfer system for so-called static energy transfer or static charging, wherein the vehicle to which the energy is transferred to does not move, i.e. is at a halt or rests. In this case, the primary unit can be designed as a so-called charging pad, wherein the charging pad is integrated into the route or mounted on the route surface (elevated charging pad).

The inductive power transfer system can also be a so-called dynamic transfer system, wherein the vehicle to which the energy is transferred to travels along the driving surface of the route.

A charging surface of the route is assigned to the primary winding. The charging surface can be a subpart of the route surface through which the primary field or a predetermined portion, e.g. a portion larger than 90%, of the primary field extends during inductive power transfer, in particular during static charging. The charging surface can have the same dimensions or larger dimensions, e.g. width and length, as an envelope of the primary winding structure, e.g. a rectangle comprising the winding structure of the primary winding. In case of a charging pad, the charging surface can correspond to the surface of the charging pad.

The primary winding structure is usually arranged under a driving surface or standing surface of the route or within such a driving or standing surface. The primary field or total field consequently extends through a part of the driving or standing surface. A foreign object located within this part can heat up because of currents induced within the foreign object.

The total field, which can be also referred to as power system transfer field, at least partially consists of the primary field. If no secondary winding structure is located within the proximity, e.g. above the primary winding structure, the total field will be equal or nearly equal to the primary field. If a secondary winding structure is located within the proximity, e.g. above the primary winding structure, the total field results from the superposition of the primary field and the secondary field, wherein the secondary field is generated by the secondary winding structure.

The currents induced within the foreign object can be caused by the total field.

The primary unit comprises the aforementioned primary winding for generating an electromagnetic primary field for the inductive power transfer which can be received by the aforementioned secondary unit.

The safety system comprises at least one capacitive sensing system, wherein the capacitive sensing system comprises multiple detection capacitors.

According to the invention, the multiple detection capacitors are arranged in an array structure, wherein the array structure covers the charging surface at least partially, e.g. more than 80%, 90%, or 95% of the charging surface. In this context, "covers" means that a least a part of the, preferably the total, primary field or total field extends through the array structure or a surface provided by the array structure. The term "covers" can also mean that in a common plane of projection an area enclosed by a minimal envelope the array structure overlaps with the charging surface at least partially.

An array structure can be a matrix-like structure providing multiple rows and columns, wherein in each row/column-position a detection capacitor is arranged. Center points of the detection capacitors can be arranged at predetermined longitudinal and lateral distances, wherein a longitudinal direction is oriented parallel to a direction of travel of the vehicle and the lateral direction is oriented perpendicular to the longitudinal direction.

In other words, a sheet-like structure comprising multiple detection capacitors is provided. The multiple detection capacitors can be located in an interspace provided by the primary winding and the charging surface. The multiple detection capacitors can be part of the route, e.g. located in a layer of the route which is arranged under the route surface or located in a layer of the route which provides the route surface. The primary winding structure can be covered by the array of the multiple detection capacitors.

Each of the detection capacitors provides a detection surface which is e.g. provided by a surface area of the electrodes of each capacitor. During inductive energy transfer, at least a part of the primary field, preferably the total primary field, will extend through the array structure of the detection capacitors. In this case, the primary field or the total field will also extend through the detection surfaces provided by the detection capacitors. It is possible that the dimensions of the detection surface(s) is/are chosen depending on the dimensions, e.g. smaller than, equal to or, in particular with a predetermined percentage, e.g. 10%, 20%, 50% or even more percent, larger than, the dimensions of the smallest object to be detected.

Each of the multiple detection capacitors can comprise a first electrode and a second electrode.

The safety system can also comprise one or more evaluation units which are connected to one, a predetermined number or all detection capacitors. The evaluation unit(s) is/are designed such that electric characteristics and/or parameters of each detection winding can be determined.

For example, the evaluation unit(s) is/are designed such that a capacitance of each detection capacitor can be determined. If a foreign object, in particular a metal object, is placed in the proximity of the primary winding, this object will also cause a change of capacitance of one or more detection capacitors. By determining the capacitance and e.g. comparing the capacitance to a reference capacitance, the presence of a foreign object can be detected reliably.

Furthermore, it is possible to determine or estimate a position of the foreign object depending on an output signal of the detection capacitors of the array of detection capacitors with respect to the array of detection capacitors. For example, depending on the output signal, e.g. an output voltage, of the detection capacitors, one or more detection capacitor(s) can be determined, wherein the output signal(s) of this/these detection capacitor(s) is/are altered or influenced by an object placed within the proximity of the detection capacitor(s), e.g. above or under a detection surface of the detection capacitor(s). If a position of the detection capacitor(s) with respect to the primary unit is known, a position of the object with respect to the primary unit, in particular the primary winding structure, can be determined.

A surveillance surface can be assigned to the array structure. The surveillance surface denotes a part of the route surface on which the object should be located in order to be detectable with a predetermined reliability. The surveillance surface can be equal to the charging surface. An object located on the surveillance surface will change an output signal of the array of detection windings at least with a predetermined percentage, e.g. with at least 10%, 20%, or 50%.

Thus, the invention is also related to an object detection system. If an object is detected, a notification signal, e.g. an electric, acoustic, haptic, or acoustic notification signal can be generated.

The arrangement of detection capacitors in an array structure advantageously allows a reliable detection of an object in a predetermined surface area of the route.

In a preferred embodiment, the capacitive sensing system is designed as a primary field or total field compensating sensing system and/or each detection capacitor is arranged and/or designed as a primary field or total field compensating capacitor.

Each detection capacitor has a first and a second electrode, e.g. a first capacitor plate and a second capacitor plate. These electrodes can form a conductor loop comprising a capacitance, wherein a primary field or a total field can induce a voltage in the conductor loop. In this context, "primary field or total field compensating" means that the capacitive sensing system and/or each of the detection capacitors is designed such that a voltage induced in the conductor loop(s) by the primary field or the total field is eliminated or reduced due to the physical design of the capacitive sensing system and/or the detection capacitors.

In the case of an existing primary field, in particular in case of inductive power transfer to the vehicle, the capacitive sensing system is exposed to the primary field or total field. This exposure can influence the electrical characteristics or parameters determined by e.g. the evaluation unit(s) and will therefore complicate the detection of foreign objects. If the sensing system and/or the detection capacitors is/are physically designed and/or arranged such that the effect of the primary field or the total field on the determination of the electrical characteristics or parameters is eliminated or reduced, this will advantageously improve the reliability of detection during inductive power transfer.

In another embodiment, the at least one detection capacitor is arranged in a conductor path, wherein the conductor path comprises an even number of counter-oriented conductor loops or turn sections. End terminals of the conductor path can be connected to an evaluation unit. In particular, the conductor path can form an even number of counter-oriented conductor loops. In this context, "counter-oriented" means that consecutive conductor loops are arranged and connected such that a current flowing through a first conductor loop in a clockwise direction will flow through a consecutive counter-oriented conductor loop in a counter-clockwise direction. In particular, the counter-oriented conductor loops, in particular complete turns, can be arranged and connected such that a voltage induced by a primary field or total field within a first conductor loop has the same magnitude as a voltage induced by the primary field in a second counter-oriented conductor loop but a different sign. The detection capacitor, e.g. capacitor plates of the detection capacitor, can provide a conductor loop or a part of one or more conductor loop(s).

In another embodiment, a first electrode of a detection capacitor comprises multiple partial electrodes, wherein a second electrode of the detection capacitor comprises multiple partial electrodes, wherein the partial electrodes are arranged and connected such that a conductor path is provided which forms an even number of counter-oriented conductor loops.

In particular, the counter-oriented conductor loops can be arranged such that a voltage induced by a primary field or total field within a first conductor loop has the same magnitude as a voltage induced by the primary field in a counter-oriented conductor loop but a different sign.

Counter-oriented e.g. means that consecutive conductor loops are arranged and connected such that a direction of a current flow in a first conductor loop is opposite to a direction of a current flow in a counter-oriented consecutive conductor loop. For example, the current in the first conductor loop can flow in a clockwise direction, wherein the current in a counter-oriented conductor loop flows in a counter-clockwise direction.

Preferably, the partial electrodes are arranged and connected such that a sequence of conductor loops with an alternating sequence of orientation is provided.

In this case, a voltage induced in the first conductor loop by the primary field or total field will have a different sign as a voltage induced by the primary field or total field in a counter-oriented conductor loop. If the partial electrodes are designed and arranged such that a geometric size of the conductor loops are equal, the induced voltages in different conductor loops will have the same magnitude. Thus, induced voltages in conductor loops having a different orientation will cancel and the primary field or total field will be compensated for.

In another embodiment, the partial electrodes are arranged in two linear arrays of partial electrodes, wherein the two linear arrays are arranged parallel to each other. In each linear array, an alternating sequence of partial electrodes of the first and the second electrode is provided, wherein partial electrodes of the first electrode are connected in series along the first and the second array, wherein partial electrodes of the second electrode of the first and the second array are connected in series along the first and second array. Preferably, the partial electrodes are designed as capacitor plates.

This advantageously provides a simple design and connection of partial electrodes.

In an alternative embodiment, the primary unit comprises an additional compensating conductor loop, wherein the additional compensating conductor loop is arranged and connected such to the electrodes of the detection capacitor that a conductor path with at least two counter-oriented conductor loops is provided. In particular, the additional compensating conductor loop can be arranged and connected to the electrodes of the detection capacitor such that a voltage induced by the primary field or total field within the compensating conductor loop is equal to a voltage induced by the primary field or total field in the capacitor loop but has a different sign. The capacitor loop denotes the previously described conductor loop provided by the electrodes of the detection capacitor.

The additional compensating conductor loop can be arranged within an electrical connection of one electrode to an evaluation unit.

Thus, a voltage induced by the primary field or total field in the capacitor loop will be compensated by a voltage induced by the primary field or total field in the compensating conductor loop. This advantageously provides a physical design of the capacitive sensing system which is a primary field or total field compensating system.

The feature that the capacitive sensing system is designed as a primary field or total field compensating sensing system and/or each detection capacitor is arranged and/or designed as a primary field or total field compensating capacitor does not depend on the feature that the capacitive sensing system provides multiple detection capacitors, in particular in an array structure. It is therefore possible that the capacitive sensing system which is designed as a primary field or total field compensating sensing system and/or wherein at least one detection capacitor is arranged and/or designed as a primary field or total field compensating capacitor according to one of the previously described embodiments constitutes an independent invention.

In another embodiment, an electrode or partial electrode is designed in a double-comb-like structure. In this case, comb teeth extend perpendicular from a central element in two opposite directions. The geometric size of the teeth and the central element is chosen such that the generation of eddy currents due to the primary field or total field within the electrode is minimized.

This advantageously allows reducing the effect of eddy currents in the proposed capacitive sensing system.

In an alternative embodiment, an electrode is designed in a single-comb-like structure. In this case, comb teeth extend perpendicular from a central element in one direction. The geometric size of the teeth and the central element is chosen such that the generation of eddy currents due to the primary field or total field within the electrode is minimized.

This advantageously allows reducing the effect of eddy currents in the proposed capacitive sensing system.

In another embodiment, the primary unit comprises an acoustic sensor and a current impulse generating means. By the current impulse generating means, a current impulse can be generated and applied to e.g. the primary winding or another excitation winding structure. In this case, an impulse-like excitation field is generated. This excitation field will generate eddy currents in a foreign metal object placed within the surveillance area. In an interaction of such eddy currents with the excitation field or another electromagnetic field, a force, in particular a Lorentz force, will act on the foreign metal object. As the force is an alternating force, the metal object can start to vibrate. Oscillations of the air or of the route structure providing the surface on which the object is placed can be caused by these vibrations, wherein said oscillations can be detected by the acoustic sensor. Alternatively or in addition, it is also possible that the object will be moved up, extended and/or deformed by the Lorentz forces. If the impulse ends, the object will return to the original state, e.g. fall down on the route surface or come back to the original shape. Because of small energy absorption of the environment, the object starts to vibrate on the surface as a result of this process.

It is also possible to detect an electromagnetic field generated by the eddy current within the foreign metal object. In this case, a permanent magnetic field can be generated, e.g. by a permanent magnet or an electromagnet, and the back-induced voltage which is induced by the magnetic field generated by the eddy current can be measured. This can be done by using a separate winding structure or the structure of the excitation winding.

This advantageously allows increasing a robustness of detection by providing an additional detection method.

The feature that the primary unit comprises an acoustic sensor and a current impulse generating means does not depend on the feature that the capacitive sensing system provides multiple detection capacitors, in particular in an array structure. It is therefore possible that the safety system wherein the primary unit comprises an acoustic sensor and a current impulse generating means constitutes an independent invention.

In a preferred embodiment, the primary unit comprises at least one primary field or total field cancellation means for generating a cancellation field, wherein the cancellation means is designed and/or arranged such that the primary field or total field can be at least partially cancelled by the cancellation field. The cancellation means can comprise one or more cancellation winding(s) in which a current can be fed. In particular, the cancellation means can be assigned to a cancellation area of the route surface, in particular of the surface of the surveillance area, wherein the cancellation field is designed such that the primary field or total field extending through the cancellation area is cancelled or reduced by the cancellation field.

Preferably, the cancellation means is provided by one or more cancellation winding(s) which is integrated into the route.

Such a safety system advantageously allows detecting a foreign object and furthermore ensures a safe operation of the inductive power transfer system. If the primary field or total field within the area of location is cancelled or reduced, heating of the object will be prevented or reduced. This, in turn, reduces a risk of injuring a person or damaging e.g. the primary unit.

The feature that the primary unit comprises at least one primary field or total field cancellation means for generating a cancellation field does not depend on the feature that the capacitive sensing system provides multiple detection capacitors, in particular in an array structure. It is therefore possible that the safety system wherein the primary unit comprises at least one primary field or total field cancellation means for generating a cancellation field constitutes an independent invention.

Further proposed is a method of operating a safety system according to one of the previous described embodiments. In such a method, an output signal of each of the the multiple detection capacitor is measured and an electrical characteristic or parameter, e.g. a capacitance or output voltage, is determined depending on the measured output signal and compared to a reference value. If the difference of the electric characteristic or parameter to the reference value is higher than a predetermined threshold value, the presence of a foreign object can be detected. This advantageously allows a simple detection of a foreign object in the proximity of the primary unit.

In another embodiment, an acoustic sensor captures sound waves in a surveillance area of the primary unit after the excitation field has been generated. An output signal of the acoustic sensor is evaluated. This advantageously increases a robustness of detection. As explained previously, eddy current can cause a vibration of the foreign metal object and therefore sound waves are being generated. By measuring these sound waves, a presence of a foreign object can be redundantly detected.

In another embodiment, a cancellation field is generated by at least one primary field or total field cancellation means if a foreign object has been detected. In particular, the cancellation field can be generated such that the primary field or total field is only cancelled at least in an area of location, wherein the area of location is the area where a detected foreign object is located on the charging surface. In this case, only a part, in particular a local part, of the primary field or total field is cancelled or reduced. This advantageously provides a location specific cancellation or reduction of the primary field or total field while an operation of the primary unit during inductive power transfer does not need to be interrupted in total.

In particular, the cancellation field can be generated such that the total field is only cancelled in an area of location, wherein the area of location is the area where a detected foreign object is located on the route surface. In this case, only a part, in particular a local part, of the total field is cancelled or reduced. This advantageously provides a location specific cancellation or reduction of the total field while an operation of the primary unit during inductive power transfer does not need to be interrupted in total.

Further proposed is a method of building a safety system for a primary unit of an inductive power transfer system, wherein the primary unit comprises at least one primary winding for generating an electromagnetic primary field for the inductive power transfer, wherein a charging surface of the route is assigned to the primary winding. The method comprises the steps of providing multiple detection capacitors,
arranging the detection capacitors in an array structure, wherein the array structure covers the charging surface at least partially.

In particular, the detection capacitors can be arranged such that a foreign object located on the charging surface changes a capacitance of the detection capacitors.

The method advantageously allows modifying existing primary units by providing additional detection capacitors.

BRIEF DESCRIPTION OF THE DRAWINGS

Examples of the invention will be described with reference to the attached figures in the following. The figures show.

DETAILED DESCRIPTION OF THE INVENTION

Figure 1:
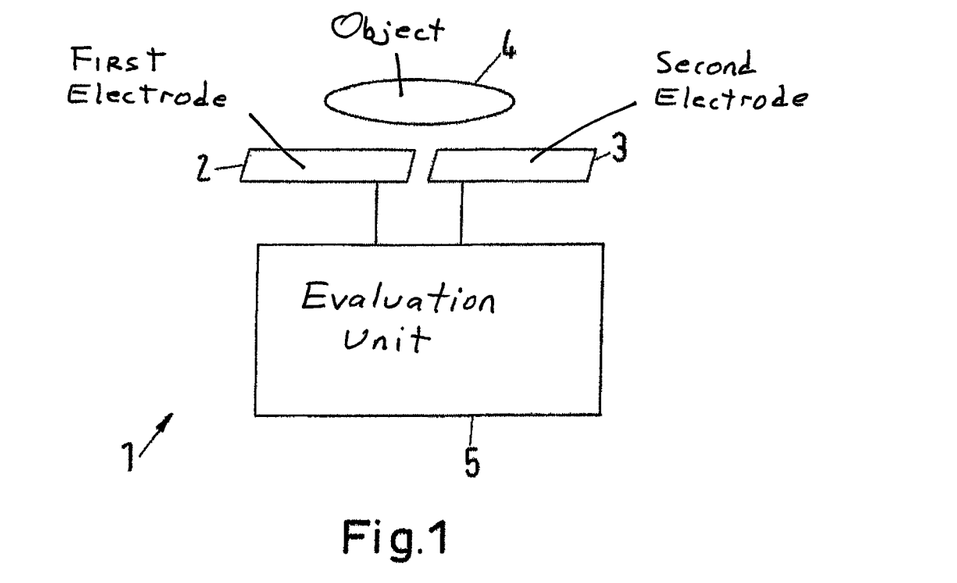
FIG. 1 a schematic block diagram of a capacitive sensing system.
Figure 2:
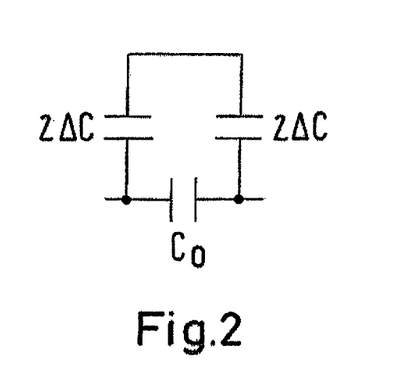
FIG. 2 a schematic equivalent circuit of the system shown in FIG. 1.

FIG. 1 shows a schematic design of a capacitive sensing system 1 for detecting an object 4. The capacitive sensing system 1 comprises a first electrode 2 and a second electrode 3. Furthermore, the capacitive sensing system 1 comprises an evaluation unit 5 which is capable to determine a capacitance provided in between the first and the second electrode 2, 3. If a base capacitance is denoted by $C_0$, FIG. 2 shows a schematic equivalent circuit of the sensing system 1 shown in FIG. 1. The object 4 provides an additional capacitance $\Delta C$ between the first and the second electrode. Depending on the additional capacitance $\Delta C$, the presence of the object 4 can be detected.

Figure 3:
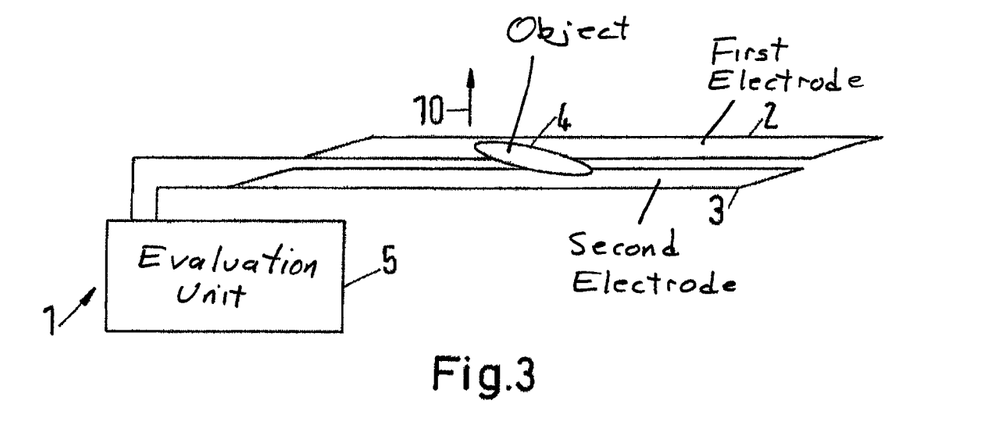
FIG. 3 a perspective view on the proposed safety system in a first embodiment.

In FIG. 3, a perspective view on a safety system 1 in a first embodiment is shown. The safety system 1 comprises a first electrode 2 and second electrode 3 which are designed as capacitor plates with predetermined surface areas. It is shown that the plate surfaces of the electrodes 2, 3 are oriented versus a charging surface (not shown) on which the object 4 is placed. Thus, the plate surfaces of the electrodes 2, 3 are not facing each other but each facing the charging surface. In other words, the plate surfaces of both electrodes 2, 3 are oriented perpendicular to a vertical direction shown by an arrow 10. The vertical direction 10 can be oriented perpendicular to the charging surface (not shown) on which the object 4 is placed. Furthermore, the vertical direction 10 can correspond to a direction of field lines of the total field generated by the primary and secondary windings (not shown). The primary winding can e.g. be arranged below the first and second electrode 2, 3 with respect to the vehicle direction 10.

The foreign object 4 which is, with respect to the vertical direction 10, placed above the plate surface areas will result in an additional capacitance $\Delta C$ (see FIG. 2) which can be determined by the evaluation unit 5. The safety system 1 allows a passive determination of the capacitance, wherein "passive" means that no additional external electric field is applied to the sensing system 1 in order to determine the capacitance. It is, however, also possible that the safety system comprises at least one excitation field generating means, e.g. an excitation winding, for generating an electromagnetic field, wherein the capacitance of the detection capacitor is determined depending on the applied electromagnetic field.

Figure 4:
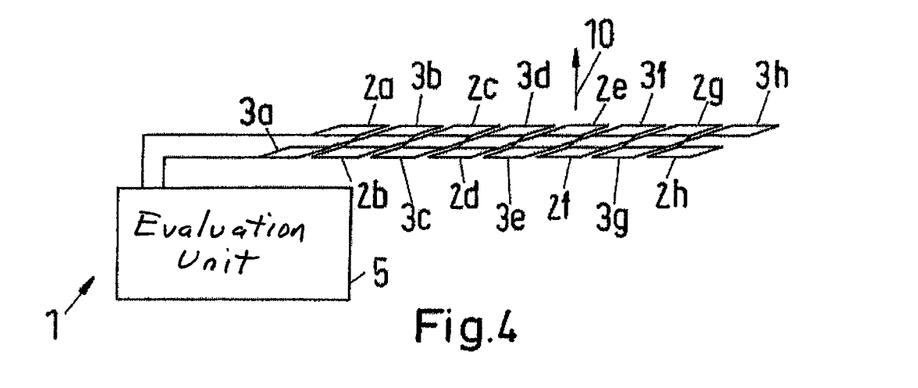
FIG. 4 a perspective view on the proposed safety system in a second embodiment.

Another design of a safety system 1 is shown in FIG. 4. In the shown embodiment, the first electrode 2 comprises multiple partial electrodes 2a, 2b, 2c, 2d, 2e, 2f, 2g, 2h, wherein the second electrode 3 also comprises multiple partial electrodes 3a, 3b, 3c, 3d, 3e, 3f, 3g, 3h. Each partial electrode 2a, . . . , 2h, 3a, . . . , 3h is designed as a plate with a predetermined surface area which is smaller than the surface area of the electrodes 2, 3 of the sensing system 1 shown in FIG. 3. An alternating primary field will generate eddy currents within the electrodes of the capacitive sensing system 1 shown in FIG. 3. Splitting up an electrode 2, 3 in multiple partial electrodes 2a, . . . , 2h, 3a, . . . , 3h will reduce the effect of eddy currents on the determination of an additional capacitance provided by an object 4. The surface areas of the partial electrodes 2a, . . . , 2h, 3a, . . . , 3h are all oriented perpendicular to the vertical direction 10.

Figure 5:
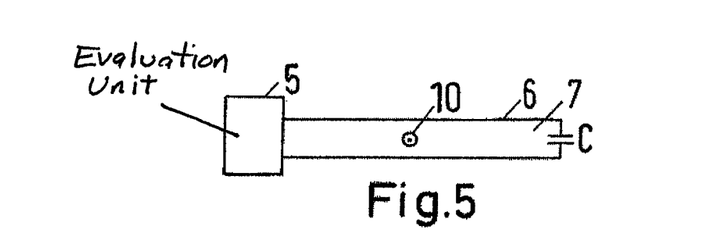
FIG. 5 a schematic equivalent circuit of the system shown in FIG. 3.

FIG. 5 shows a schematic equivalent circuit of the capacitive sensing system 1 shown in FIG. 3. It is shown that the electrodes 2, 3 and the capacitance C provided by the capacitor form a conductor loop 6 enclosing a loop surface 7. During inductive power transfer, the total field (not shown) will extend through the loop surface 7 in a vertical direction 10 and thus, an induced voltage will be generated in the conductor loop 6.

Figure 6:
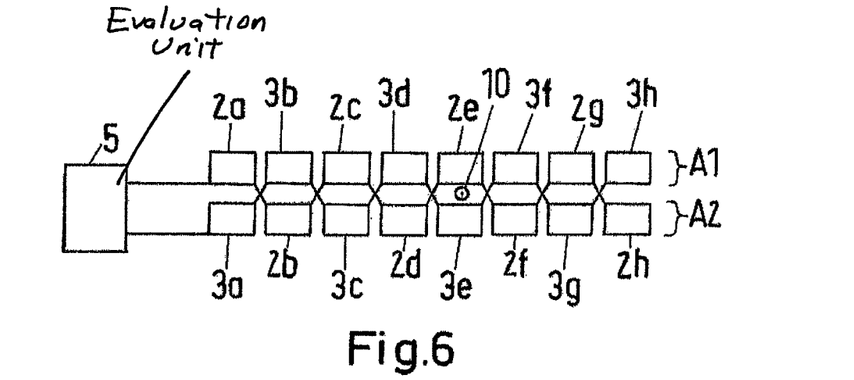
FIG. 6 two parallel arrays of partial electrodes.

FIG. 6 shows a top view on the capacitive sensing system 1 shown in FIG. 4 comprising the partial electrodes 2a, . . . , 2h, 3a, . . . , 3h. It is shown that the partial electrodes 2a, . . . , 2h, 3a, . . . , 3h of the first and second electrode 2,3 are arranged in two linear arrays A1, A2, wherein the arrays A1, A2 are arranged parallel to each other. In each linear array A1, A2, an alternating sequence of partial electrodes 2a, . . . , 2h, 3a, . . . , 3h of the first and the second electrode 2, 3 is provided, wherein partial electrodes 2a, . . . , 2h of the first electrode 2 are connected in series along the first and the second array A1, A2. Also, partial electrodes 3a, . . . , 3h of the second electrode 3 of the first and the second array A1, A2 are connected in series along the first and second array A1, A2. Thus, the first array A1 comprises partial electrodes 2a, 3b, 2c, 3d, 2e, 3f, 2g, 3h and the second array A2 comprises partial electrodes 3a, 2b, 3c, 2d, 3e, 2f, 3g, 2h.

With this arrangement, a negative effect of eddy current can be further minimized.

Figure 7:
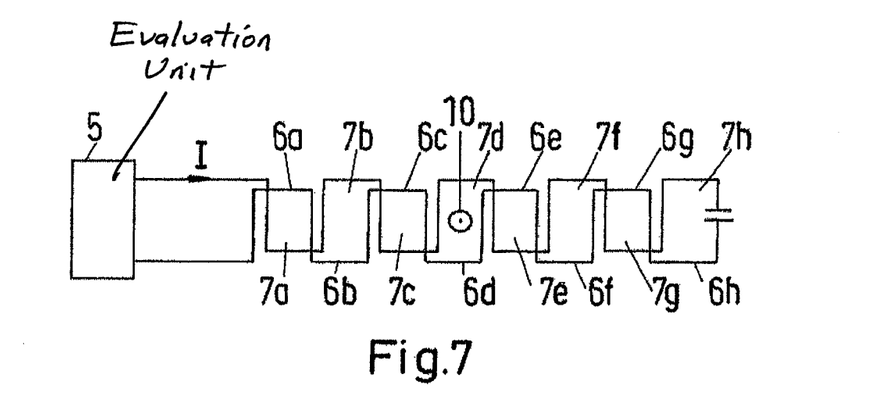
FIG. 7 a schematic equivalent circuit of the system shown in FIG. 6.

Another effect of the capacitive sensing system 1 can be illustrated by visualizing the equivalent circuit of the sensing system 1 shown in FIG. 6. FIG. 7 shows this equivalent circuit. It can be seen that the partial electrodes 2a, . . . , 2h, 3a, . . . , 3h are arranged and connected such that eight consecutive conductor loops 6a, 6b, 6c, 6d, 6e, 6f, 6g, 6h are provided. The sequence of the eight conductor loops 6a, . . . , 6h is a sequence of conductor loops 6a, . . . , 6h with an alternating orientation.

A direction of a current I flowing in the uneven numbered conductor loops 6a, 6c, 6e, 6g corresponds to a counter-clockwise direction, wherein a direction of a current I flowing in the even numbered conductor loops 6b, 6d, 6f, 6h corresponds to a clockwise direction. The clockwise direction is defined with respect to the vertical direction 10.

If a total field is generated such that it extends through a surface 7a of the first conductor loop 6a in a vertical direction 10, wherein the total field points out of the plane of projection, a voltage will be induced and a current I will flow in a counter-clockwise direction within the first conductor loop 6a. The same total field, however, will also extend through a surface 7b of the second conductor loop 6b. In this conductor loop 6b, another voltage will be induced and a current I will flow in a clockwise direction. The same effect holds for the remaining conductor loops 6c, . . . , 6h and the corresponding surfaces 7c, ..., 7h. Thus, the overall current flow due to the total field will be (theoretically) zero and thus, the effect of the total field on the determination of the capacitance will be minimized.

In this case, a voltage induced in the first conductor loop 6a by the total field will have a different sign as a voltage induced by the total field in a consecutive counter-oriented conductor loop 6b. If the partial electrodes are designed and arranged such that a geometric size of the conductor loops 6a, ..., 6h are similar, the induced voltages in different conductor loops 6a, ..., 6h will have the same magnitude. Thus, voltages induced in the conductor loops 6a, ..., 6h having a different orientation will cancel and the primary field will be compensated for.

Figure 8:
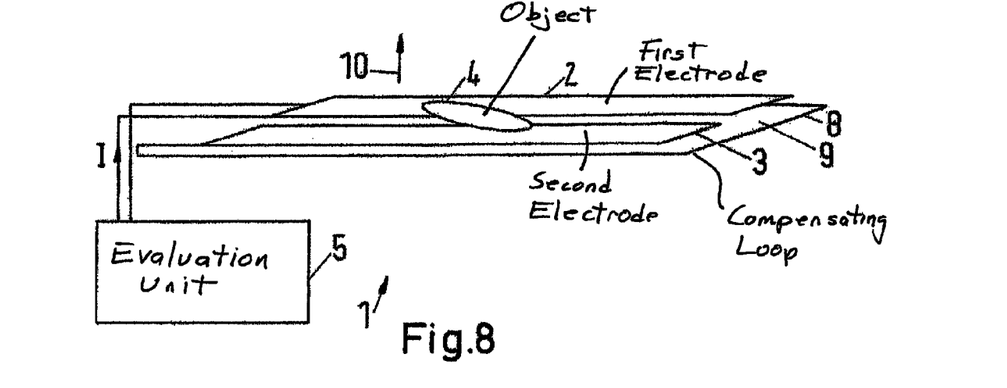
FIG. 8 a perspective view on the proposed safety system in a third embodiment.

FIG. 8 shows a perspective view on the proposed safety system in a third embodiment. The capacitive sensing system 1 comprises a first electrode 2, a second electrode 3, an evaluation unit 5 and an additional compensating conductor loop 8. The second electrode 3 is connected to a terminal of the evaluation unit 5 via the compensating conductor loop 8.

The compensating conductor loop 8 is arranged such that it is counter-oriented with respect to a capacitor loop provided by the first and second electrode 2, 3. This means that a current I which flows through the capacitor loop in a clockwise direction will flow through the compensating conductor loop 8 in a counter-clockwise direction or vice versa. The compensating conductor loop 8 is arranged below the electrodes 2, 3 with respect to the vertical direction 10. If a total field extends through the loop surface enclosed by the capacitor loop in a vertical direction 10, a voltage will be induced and a current flow will be generated due to the induced voltage. The same total field will also extend through the surface 9 enclosed by the compensating loop 8. A compensating voltage with a different sign will be induced and a current flow will be generated due to the induced compensating voltage. If the geometric design, e.g. the length, width, the diameter or other geometric properties of the compensating loop are chosen such that the compensating voltage has the same magnitude as the voltage induced in the capacitor loop, the current flow due to the induced voltages will cancel. Thus, the influence of the total field on the determination of the capacitance of the capacitor loop will be eliminated or reduced.

Figure 9:
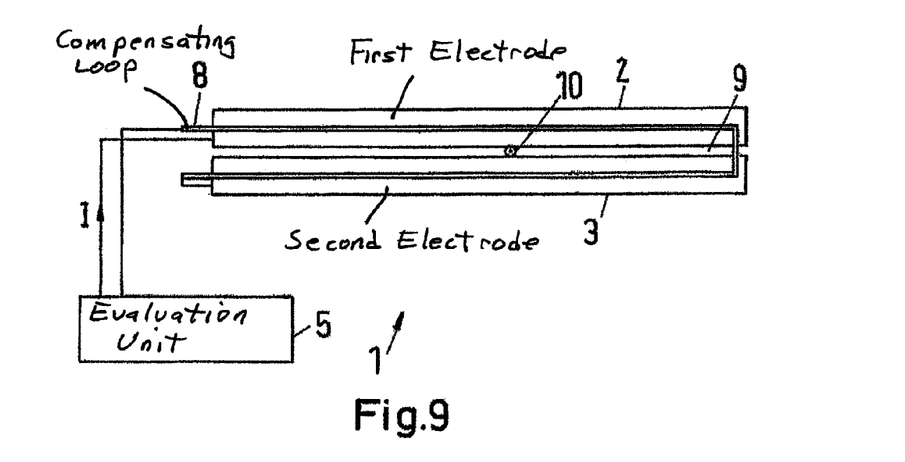
FIG. 9 a top view on the safety system shown in FIG. 8.

FIG. 9 shows a top view on the safety system shown in FIG. 8. It is shown that a central axis of the capacitor loop is aligned with a central axis of the compensating conductor loop 8. This means that the enclosed surfaces 9 overlap at least partially, preferably fully, in a common plane of projection perpendicular to the vertical direction 10. A direction pointing out of the plane of projection can be a vertical direction 10 with respect to a route or charging surface. In this case, the compensating conductor loop 8 is arranged below the electrodes 2, 3 with respect to the vertical direction 10 (for illustration purposes, the conductors providing the compensating conductor loop 8 are, however, shown in FIG. 9). It is, of course, possible, that the compensating conductor loop 8 is arranged above the electrodes 2, 3. Also, a terminal of the evaluation unit 5 can be connected to the first electrode 2 via the compensating conductor loop 8.

The conductor loop 8 is designed such that a first part of the compensating conductor loop 8 extends parallel to a central longitudinal axis of the first electrode 2 and a second part of the compensating conductor loop 8 extends parallel to a central longitudinal axis of the second electrode 3. A third part of the compensating conductor loop 8 connects the first and the second conductor part. It is shown that the third conductor part is arranged at an opposite end of the electrodes as the connecting points of the electrodes. This first conductor part and the second conductor part are arranged at a predetermined distance under or above the first and the second electrode 2, 3, wherein the distance can e.g. be measured in a direction perpendicular to the surface areas of the electrodes (vertical direction 10). Also, the first and the second conductor part are displaces, with a predetermined distance with respect to one another.

Figure 10A:
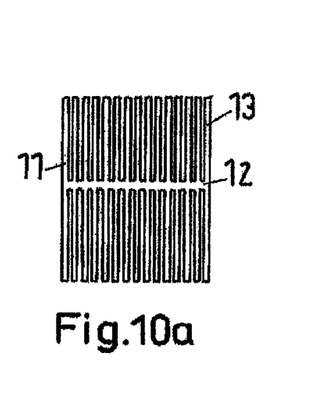
FIG. 10a an electrode with a double-comb structure.

FIG. 10a shows an electrode 11 with a double-comb structure which can be used as an electrode 2, 3 or a partial electrode 2a, ..., 2h, 3a, ..., 3h. The comb structure comprises a central bridge element 12 and multiple comb teeth 13 which extend perpendicular in both directions from the central bridge element 12. For illustration purposes, only one tooth is denoted by the reference numeral 13. A width and length of the teeth 13 and a distance in between the teeth 13 is chosen depending on the characteristics of the total field, e.g. a frequency, and material properties such that an amount of eddy currents induced by the total field is minimized.

Figure 10B:
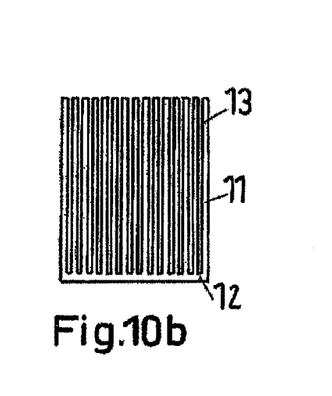
FIG. 10b an electrode with a single-comb structure.

FIG. 10b shows an electrode 11 with a single-comb structure which can be used as an electrode 2, 3 or a partial electrode 2a, ..., 2h, 3a, ..., 3h. In contrast to the electrode 11 shown in FIG. 10a, the electrode 11 comprises a central bridge element 12 and multiple comb teeth 13 which extend perpendicular in only one direction from the central bridge element 12.

Figure 11:
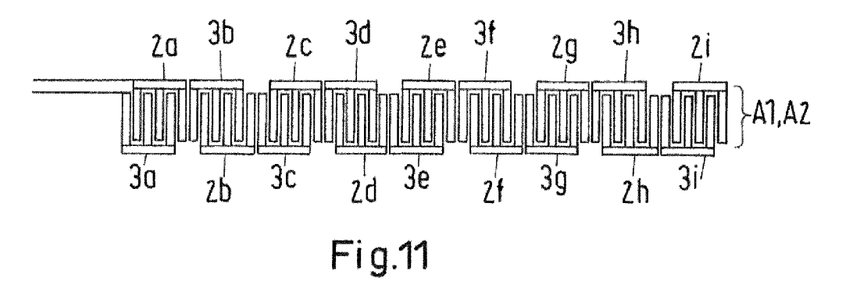
FIG. 11 two parallel arrays of partial electrodes with a single-comb structure, and FIG. 12 a top view on the proposed safety system in a fourth embodiment.

FIG. 11 shows two parallel arrays of partial electrodes 2a, ..., 2i, 3a, ..., 3i, wherein each partial electrode 2a, ..., 2i, 3a, ..., 3i is designed with a single-comb structure. It is shown that the partial electrodes 2a, ..., 2i, 3a, ..., 3i of the first and second electrode 2,3 are arranged in two linear arrays A1, A2, wherein the partial electrodes 2a, ..., 2i of the first array A1 are teethed or meshed with corresponding partial electrodes 3a, ..., 3i of the second array A2. In each linear array A1, A2, an alternating sequence of partial electrodes 2a, ..., 2i, 3a, ..., 3i of the first and the second electrode 2, 3 is provided, wherein partial electrodes 2a, ..., 2i of the first electrode 2 are connected in series along the first and the second array A1, A2. Also, partial electrodes 3a, ..., 3i of the second electrode 3 are connected in series along the first and second array A1, A2. Thus, the first array A1 comprises partial electrodes 2a, 3b, 2c, 3d, 2e, 3f, 2g, 3h, 2i and the second array A2 comprises partial electrodes 3a, 2b, 3c, 2d, 3e, 2f, 3g, 2h, 3i.

Figure 12:
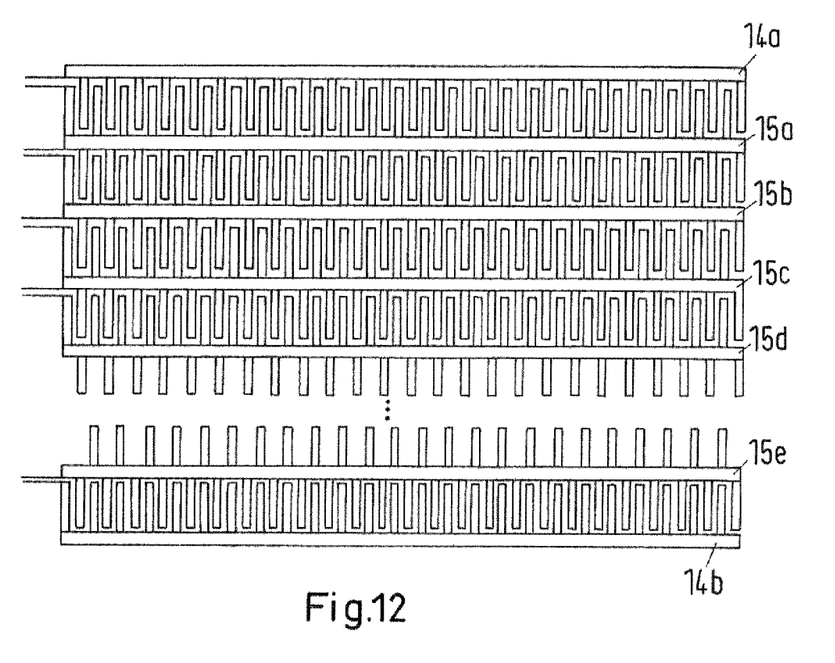

FIG. 12 shows a top view on the proposed safety system in a fourth embodiment. It is shown that the safety system comprises multiple detection capacitors provided by multiple electrodes which are arranged in an array structure. End electrodes 14a, 14b are designed as single-comb electrodes. Intermediate electrodes 15a, 15b, 15c, 15d, 15e are designed as double-comb electrodes. The end electrodes 14a, 14b and the intermediate electrodes 15a, ..., 15e are toothed or meshed. Also, the intermediate electrodes 15a, ..., 15e are toothed or meshed. For example, the teeth of the end electrode 14a mesh with the teeth of intermediate electrode 15a. Teeth of intermediate electrode 15a arranged at the opposite side of the teeth meshing with the teeth of end electrode 14a mesh with teeth of a consecutive intermediate electrode 15b. Teeth of intermediate electrode 15b arranged at the opposite side of the teeth meshing with the teeth of intermediate electrode 15a mesh with teeth of a consecutive intermediate electrode 15c and so on. Thus, an intermediate electrode 15a provides a second electrode of a first capacitor which is provided by the end electrode 14a and the intermediate electrode 15a and a second electrode of a consecutive capacitor which is provided by the intermediate electrodes 15a, 15b. This allows a space-saving design of the safety system. It is possible to provide compensating conductor loops (not shown), wherein the additional compensating conductor loops are arranged and connected such to the electrodes 14a, 15a, . . . , 15e, 14b that each conductor path provides at least two counter-oriented conductor loops, wherein a conductor path comprises a first and a second electrode and one of the compensating conductor loops.

The invention claimed is:

1. A safety system for an inductive power transfer system for transferring power to a vehicle on a surface of a route, comprising:
 a primary unit of at least one primary winding for generating an electromagnetic primary field for the inductive power transfer,
 a charging surface of the route assigned to the primary winding, and
 at least one capacitive sensing system, wherein the capacitive sensing system comprises multiple detection capacitors,
 wherein each of the multiple detection capacitors has a first electrode and a second electrode, wherein the multiple detection capacitors are arranged in an array structure, and wherein the array structure covers the charging surface at least partially, and wherein at least one detection capacitor is arranged in a conductor path, wherein the conductor path comprises at least two counter-oriented conductor loops.

2. The safety system according to claim 1, wherein the capacitive sensing system is designed and/or arranged as a primary field or a total field compensating sensing system.

3. The safety system according to claim 1, wherein the first electrode comprises multiple partial electrodes, wherein the second electrode comprises multiple partial electrodes, and wherein the partial electrodes are arranged and connected such that a conductor path is provided which forms at least two counter-oriented conductor loops.

4. The safety system according to claim 3, wherein the partial electrodes are arranged in two linear arrays of partial electrodes, wherein in each linear array an alternating sequence of partial electrodes of the first and the second electrode is provided, wherein partial electrodes of the first electrode are connected in series along the first and the second array, wherein partial electrodes of the second electrode of the first and the second array are connected in series along the first and second array.

5. The safety system according to claim 1, wherein the primary unit comprises an additional compensating conductor loop, wherein the additional compensating conductor loop is arranged and connected to the electrodes of the detection capacitor such that a conductor path with at least two counter-oriented conductor loops is provided.

6. The safety system according to claim 1, wherein the first electrode or the second electrode or any of the partial electrodes is designed in a double-comb-like structure.

7. The safety system according to claim 1, wherein the first electrode or the second electrode or any of the partial electrodes is designed in a single-comb-like structure.

8. The safety system according to claim 1, wherein the safety system comprises an acoustic sensor and a current impulse generating means.

9. The safety system according to claim 1, wherein the safety system comprises at least one primary field cancellation means for generating a cancellation field, wherein the cancellation means is designed and/or arranged such that the primary field or the total field can be at least partially cancelled by the cancellation field.

10. A method of operating the safety system of claim 1, comprising
 measuring an output signal of each of the multiple detection capacitors,
 determining an electrical characteristic or parameter depending on the measured output signal, and
 comparing the electrical characteristic or parameter to a reference value.

11. The method according to claim 10, further comprising the steps of:
 capturing with an acoustic sensor, sound waves after an excitation field has been generated, and
 evaluating an output signal of the acoustic sensor.

12. The method according to claim 10, further comprising the step of:
 generating a cancellation field by at least one primary field cancellation means if a foreign object has been detected.

13. A method of building the safety system of claim 1, comprising:
 providing multiple detection capacitors, and
 arranging the detection capacitors in an array structure, wherein the array structure covers the charging surface at least partially.

* * * * *